United States Patent [19]

Izzard

[11] Patent Number: 5,119,590
[45] Date of Patent: Jun. 9, 1992

[54] PLANT GROWING KIT

[76] Inventor: Jackie V. Izzard, 489 Broadview Ave., Toronto, Ontario, Canada, M4K 2N5

[21] Appl. No.: 603,296

[22] Filed: Oct. 25, 1990

[51] Int. Cl.$^5$ .............................................. A01G 9/002
[52] U.S. Cl. ........................................................ 47/84
[58] Field of Search ................... 47/84, 66, 74–78, 47/73, 72, 9; 206/423

[56] References Cited

U.S. PATENT DOCUMENTS

| 1,828,448 | 10/1931 | Seidel | 206/423 |
|---|---|---|---|
| 2,260,436 | 10/1941 | Chambers | 206/423 |
| 2,721,022 | 10/1955 | Billerbeck | 206/423 |
| 3,971,160 | 7/1976 | Vajtay | 206/423 |
| 4,124,953 | 11/1978 | Patton | 47/84 |

FOREIGN PATENT DOCUMENTS 8006001  6/1982  Netherlands .............. 47/84

OTHER PUBLICATIONS

*Plant Propagation*, Philip McMillan Browse, Mitchell Beazley Publishers Limited, 1979 pp. 34, 6, 11, 12, 10.

Primary Examiner—David A. Scherbel
Assistant Examiner—Michele A. VanPatten
Attorney, Agent, or Firm—Longacre & White

[57] ABSTRACT

A kit is provided for cultivating a plant, e.g. a pine tree. The kit comprises a container in which the components of the kit are housed and which also serves as a growing pot. Inside the container is a package of seed or seeds, and a growing medium. The growing medium preferably comprises a first composition which is peat, for example in the form of a water-expandable pellet, and a second composition such as gravel which is placed over the peat in the container once the seeds have been planted.

14 Claims, 1 Drawing Sheet

PLANT GROWING KIT

FIELD OF THE INVENTION

This invention relates to a kit for cultivating a plant, more particularly to a kit including substantially all the necessary principal components for planting, germinating and growing a plant, for example a tree.

BACKGROUND OF THE INVENTION

Recent years have seen an increase in public awareness and concern over environmental issues, particularly the prospect of global warming resulting from the so-called greenhouse effect. This effect results from an increased concentration of carbon dioxide and other gases in the earth's atmosphere, which causes increased retention of heat energy in the lower regions of the earth's atmosphere. This effect is caused not only by the burning of increased amounts of fossil fuels but also by the high rate of deforestation in many parts of the world, since trees and other plants are important for absorbing atmospheric carbon dioxide and converting it into oxygen.

Accordingly, there is a need to counteract these detrimental effects if the earth's environment is to be preserved. One of the ways this may be done is by increasing the population of trees or other plants, thereby providing a replenished means for carbon dioxide absorption from the atmosphere, as well as contributing to the health of the environment by reducing pollution and soil erosion and replenishing wildlife habitat.

Preferably this increase of tree and plant population should be widespread and on an overall large scale if it is to be effective. Therefore, it would be desirable to provide means for cultivating and growing trees or other plants, which may be conveniently distributed in large numbers over a wide area to a large number of individuals, each of whom could thus participate in the effort to reduce the detrimental greenhouse effect.

SUMMARY OF THE INVENTION

Accordingly, in one aspect the present invention provides a kit for cultivating a plant. The kit includes:
[i] at least one seed of said plant,
[ii] an amount of a growing medium for germination and growth of the seed, said growing medium comprising at least one growing composition, and
[iii] a container for the growing medium, in which the plant is to be cultivated.

Each growing composition of the growing medium and the seed or seeds are provided in respective packages within the provided container.

Preferably, the at least one growing composition is peat, for example sphagnum peat moss, and is desirably in the form of a water-expandable pellet, whereby its reduced size allows all the components of the kit to be housed in the container, while enabling the growing medium in use to be of a sufficient volume to substantially fill the container. The growing medium may comprise a second growing composition, such as gravel, which may be placed in the container on top of the peat when the kit is in use.

Preferably, the container of the kit is a box formed of water-resistant cardboard. This allows the container to be used as a growing pot, without leakage of water therefrom, as well as a convenient housing for the kit components. Any suitable treated cardboard, e.g. waxed cardboard, may be used as the box material.

In a second aspect, the present invention provides a method for cultivating a plant from a kit according to the first aspect of the invention. In the method, the respective packages are removed from the container in which they were housed for the purpose of distribution, transport, sale, etc., and the or at least one growing composition of the growing medium is placed in the container. This first growing composition is preferably peat and is preferably provided in the form of a water-expandable pellet which can be soaked with water, and thereby expanded, prior to placing in the container. The seed or seeds are then planted in the growing composition in the container, and optionally a second growing composition, e.g. gravel, is then placed in the container over the first growing composition, for example in order to improve moisture retention of the growing medium. After planting, the seed or seeds are allowed to germinate and grow under suitable conditions, i.e. of light, warmth, and moisture. The exact conditions will generally be determined by the species of tree or plant being cultivated. Examples of suitable species are Red Pine Tree, Southern Pine Tree and Ponderosa Pine Tree.

DETAILED DESCRIPTION OF THE PREFERRED EMBODIMENTS

Figure 1:
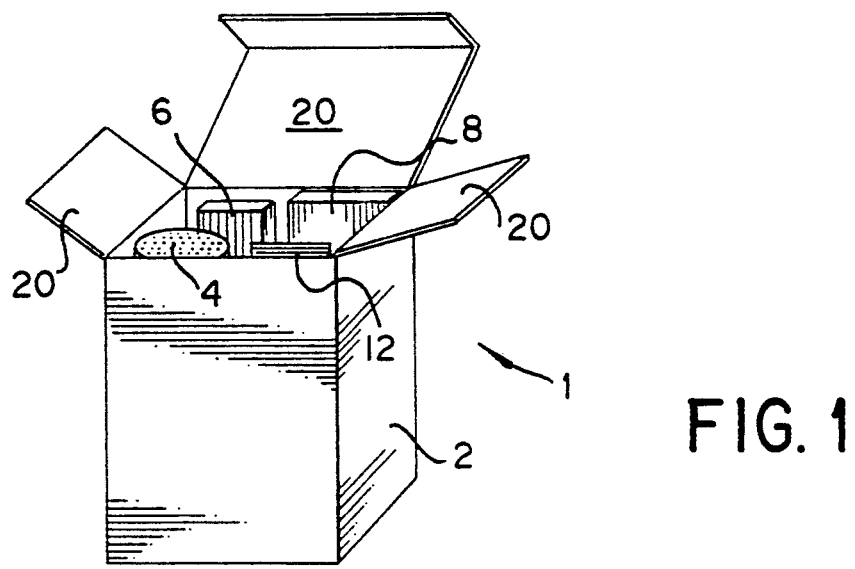
FIG. 1 is a perspective view of a kit in accordance with the first aspect of the invention.

Referring to FIG. 1, a kit 1 comprises a box 2 in which is provided a package of seeds 6, a package of gravel 8 and a pellet of water-expandable sphagnum moss peat 4. Suitably, four or five seeds are provided in the package 6. The packaging material of packages 6 and 8 may be formed of any suitable material, for example metal foil, plastic or paper. Also provided within the box 2 may be a leaflet 12, containing an explanation of the greenhouse effect and instructions for using the kit. The positioning of the components within the box 2 as shown in the FIGURE is purely illustrative and any suitable configuration may be utilized, depending upon the actual size and shape of the various items.

Figure 2:
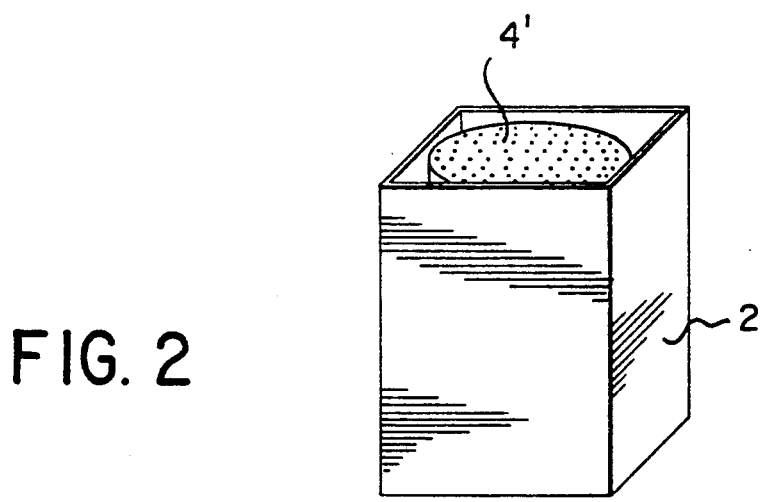
FIG. 2 is a perspective view of the container in which the growing medium has been placed and the seed or seeds have been planted.

To use the kit, the packages of seeds 6 and gravel 8, the peat pellet 4 and instruction leaflet 12 are removed from the box 2 and the peat pellet 4 is prepared for use. This is done by soaking the pellet with water, e.g. in a receptacle, until the pellet is sufficiently expanded and saturated to the desired degree. The expanded pellet 4' is placed in the empty box 2 and the seeds from the package 6 are then planted into the peat pellet 4'. Flaps 20 of the box 2 which were used to close the box during distribution, transport, sale, etc., may be removed if desired, as shown in FIG. 2. Following the planting of the seeds, the gravel from the package 8 is applied over the top of the peat to provide a covering layer which helps to prevent loss of moisture through evaporation.

The whole container may now be placed in appropriate conditions of light, warmth, and moisture, in order to encourage the seeds to germinate and sprout. Once seedlings are well established, future growth can be promoted by known methods, until the tree or plant is sufficiently mature to be transplanted into a permanent site.

I claim:

1. A method of cultivating a tree from a kit comprising in combination at least one seed of said plant, an amount of a compressed peat growing medium, for germination and growth of said seed or seeds upon the absorption of water into said compressed peat, said growing medium comprising at least one growing composition, and a water resistant cardboard container for containing said growing medium, and at least one seed, in which said plant is to be initially cultivated, said container being sized so as to snugly accommodate the volume said expanded peat wherein, said growing medium and said seed or seeds are each provided in respective packages within said container, said method comprising the steps of:

(i) removing said respective packages from said container;
(ii) adding water to the growing medium to expand said medium to its expanded size and placing said expanded growing medium snugly into said container;
(iii) planting said seed or seeds in said growing composition by pushing said seed or seeds into an upper surface of said growing medium;
(iv) allowing said seed or seeds to germinate and grow under suitable growing conditions.

2. A method according to claim 1, wherein a second growing composition is placed in said container after step [iii].

3. A method according to claim 2, wherein said second growing composition is gravel.

4. A method according to claim 1, wherein the growing composition of step [ii] is peat.

5. A method according to claim 4, wherein said peat is in the form of a water-expandable pellet which is treated with water and thereby expanded prior to placing in the container.

6. A method according to claim 1, wherein said container is a box formed of water resistant cardboard.

7. A method according to claim 1, wherein said plant is selected from the group consisting of Red Pine Tree, Southern Pine Tree and Ponderosa Pine Tree, and such selection is predicated on the geographic locale of the anticipated growing environment of said plant.

8. A kit for cultivating a plant, the kit comprising in combination:

a first packet containing at least one seed of said plant;
an amount of a compressed peat growing medium for germination and growth of said seed or seeds upon the absorption of water into said compressed peat, said growing medium comprising at least one growing composition,
a water resistant cardboard container, for containing said growing medium and said first packet, in which said plant is to be initially cultivated, said container being sized so as to snugly accommodate the compressed peat growing medium when said growing medium has been expanded by the addition of water, wherein during said initial cultivation said peat, and seed are arranged in said container.

9. A kit according to claim 8, wherein said growing medium comprises peat as a first growing composition.

10. A kit according to claim 9, wherein said peat is in the form of a water-expandable pellet.

11. A kit according to claim 9, wherein said growing medium further comprises gravel as a second growing composition.

12. A kit according to claim 8, wherein said container is a box formed of water resistant cardboard.

13. A kit according to claim 8, wherein said plant is selected from the group consisting of Red Pine Tree, Southern Pine Tree and Ponderosa Pine Tree, and such selection is predicated on the geographic locale of the anticipated growing environment of said plant.

14. A kit for cultivating a plant, the kit comprising in combination:

at least one seed of said plant;
an amount of gravel;
an amount of a compressed peat growing medium for germination and growth of said seed or seeds upon the absorption of water into said compressed peat, said growing medium comprising at least one growing composition;
a water resistant cardboard container for containing said growing medium, said seed, and said amount of gravel, in which said plant is to be initially cultivated, said container being sized so as to snugly accommodate the compressed peat growing medium when said growing medium has been expanded by the addition of water, wherein during said initial cultivation said peat, gravel, and seed are arranged in said container.

* * * * *